(12) United States Patent
Raichelgauz et al.

(10) Patent No.: US 9,330,189 B2
(45) Date of Patent: May 3, 2016

(54) SYSTEM AND METHOD FOR CAPTURING A MULTIMEDIA CONTENT ITEM BY A MOBILE DEVICE AND MATCHING SEQUENTIALLY RELEVANT CONTENT TO THE MULTIMEDIA CONTENT ITEM

(71) Applicant: CORTICA LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 186 days.

(21) Appl. No.: 14/167,388

(22) Filed: Jan. 29, 2014

(65) Prior Publication Data

US 2014/0149443 A1 May 29, 2014

Related U.S. Application Data

(63) Continuation-in-part of application No. 13/685,182, filed on Nov. 26, 2012, now Pat. No. 9,235,557, which is a continuation-in-part of application No. 13/624,397, filed on Sep. 21, 2012, now Pat. No.
(Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 15/18* (2006.01)
*G06E 1/00* (2006.01)
(Continued)

(52) U.S. Cl.
CPC ....... *G06F 17/30884* (2013.01); *H04H 20/103* (2013.01); *H04H 60/37* (2013.01); *H04H 60/58* (2013.01); *H04H 60/59* (2013.01); *H04H 60/66* (2013.01); *H04N 7/17318* (2013.01); *H04N 21/25891* (2013.01); *H04N 21/2668* (2013.01);
(Continued)

(58) Field of Classification Search
None
See application file for complete search history.

(56) References Cited

U.S. PATENT DOCUMENTS 4,972,363 A 11/1990 Nguyen et al.
5,887,193 A 3/1999 Takahashi et al.
(Continued)

FOREIGN PATENT DOCUMENTS

WO 02/31764 4/2002
WO 2007/049282 5/2007

OTHER PUBLICATIONS

Instant Mobile Video Search With Layered Audio-Video Indexing and Progressive Transmission Wu Liu; Tao Mei; Yongdong Zhang Multimedia, IEEE Transactions on Year: 2014, vol. 16, Issue: 8 pp. 2242-2255, DOI: 10.1109/TMM.2014.2359332 IEEE Journals & Magazines.*
(Continued)

*Primary Examiner* — Michael B Holmes
(74) *Attorney, Agent, or Firm* — M&B IP Analysts, LLC

(57) ABSTRACT

A method and system for matching sequentially relevant content to at least one multimedia content item (MMCI) captured by a mobile device are provided. The method comprises receiving from a mobile device the MMCI captured by at least one sensor of the mobile device; generating a signature for the captured MMCI; and matching at least one sequentially relevant content item respective of the signature of the captured MMCI.

30 Claims, 5 Drawing Sheets

Related U.S. Application Data 9,191,626, and a continuation-in-part of application No. 13/344,400, filed on Jan. 5, 2012, now Pat. No. 8,959,037, which is a continuation of application No. 12/434,221, filed on May 1, 2009, now Pat. No. 8,112,376, which is a continuation-in-part of application No. 12/084,150, filed as application No. PCT/IL2006/001235 on Oct. 26, 2006, now Pat. No. 8,655,801, which is a continuation-in-part of application No. 12/195,863, filed on Aug. 21, 2008, now Pat. No. 8,326,775.

(60) Provisional application No. 61/766,703, filed on Feb. 20, 2013.

(51) Int. Cl.

| | | |
|---|---|---|
| *G06E 3/00* | (2006.01) | |
| *G06G 7/00* | (2006.01) | |
| *G06F 17/30* | (2006.01) | |
| *H04H 20/10* | (2008.01) | |
| *H04H 60/37* | (2008.01) | |
| *H04H 60/66* | (2008.01) | |
| *H04N 7/173* | (2011.01) | |
| *H04N 21/258* | (2011.01) | |
| *H04N 21/2668* | (2011.01) | |
| *H04N 21/466* | (2011.01) | |
| *H04N 21/81* | (2011.01) | |
| *H04H 60/58* | (2008.01) | |
| *H04H 60/59* | (2008.01) | |
| *H04H 60/52* | (2008.01) | |

(52) U.S. Cl.
CPC .......... *H04N 21/466* (2013.01); *H04N 21/8106* (2013.01); *H04H 60/52* (2013.01)

(56) References Cited

U.S. PATENT DOCUMENTS

| | | | |
|---|---|---|---|
| 5,978,754 A | 11/1999 | Kumano | |
| 6,052,481 A | 4/2000 | Grajski et al. | |
| 6,076,088 A | 6/2000 | Paik et al. | |
| 6,122,628 A | 9/2000 | Castelli et al. | |
| 6,128,651 A | 10/2000 | Cezar | |
| 6,243,375 B1 | 6/2001 | Speicher | |
| 6,381,656 B1 | 4/2002 | Shankman | |
| 6,422,617 B1 | 7/2002 | Fukumoto et al. | |
| 6,611,628 B1 | 8/2003 | Sekiguchi et al. | |
| 6,618,711 B1 | 9/2003 | Ananth | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,751,613 B1 | 6/2004 | Lee et al. | |
| 6,754,435 B2 | 6/2004 | Kim | |
| 6,763,519 B1 | 7/2004 | McColl et al. | |
| 6,804,356 B1 | 10/2004 | Krishnamachari | |
| 6,819,797 B1 | 11/2004 | Smith et al. | |
| 6,845,374 B1 | 1/2005 | Oliver et al. | |
| 6,901,207 B1 | 5/2005 | Watkins | |
| 7,006,689 B2 | 2/2006 | Kasutani | |
| 7,013,051 B2 | 3/2006 | Sekiguchi et al. | |
| 7,020,654 B1 | 3/2006 | Najmi | |
| 7,047,033 B2 | 5/2006 | Wyler | |
| 7,260,564 B1 | 8/2007 | Lynn et al. | |
| 7,302,117 B2 | 11/2007 | Sekiguchi et al. | |
| 7,313,805 B1 | 12/2007 | Rosin et al. | |
| 7,340,458 B2 | 3/2008 | Vaithilingam et al. | |
| 7,353,224 B2 | 4/2008 | Chen et al. | |
| 7,376,672 B2 | 5/2008 | Weare | |
| 7,376,722 B1 | 5/2008 | Sim et al. | |
| 7,433,895 B2 | 10/2008 | Li et al. | |
| 7,464,086 B2 | 12/2008 | Black et al. | |
| 7,526,607 B1 | 4/2009 | Singh et al. | |
| 7,536,417 B2 | 5/2009 | Walsh et al. | |
| 7,574,668 B2 | 8/2009 | Nunez et al. | |
| 7,660,737 B1 | 2/2010 | Lim et al. | |
| 7,694,318 B2 | 4/2010 | Eldering et al. | |
| 7,697,791 B1 | 4/2010 | Chan et al. | |
| 7,769,221 B1 | 8/2010 | Shakes et al. | |
| 7,788,132 B2 | 8/2010 | Desikan et al. | |
| 7,860,895 B1 | 12/2010 | Scofield et al. | |
| 7,904,503 B2 | 3/2011 | Van De Sluis | |
| 7,920,894 B2 | 4/2011 | Wyler | |
| 7,921,107 B2 | 4/2011 | Chang et al. | |
| 7,974,994 B2 | 7/2011 | Li et al. | |
| 7,987,194 B1 | 7/2011 | Walker et al. | |
| 7,991,715 B2 | 8/2011 | Schiff et al. | |
| 8,000,655 B2 | 8/2011 | Wang et al. | |
| 8,036,893 B2 | 10/2011 | Reich | |
| 8,098,934 B2 | 1/2012 | Vincent et al. | |
| 8,266,185 B2 | 9/2012 | Raichelgauz et al. | |
| 8,312,031 B2 | 11/2012 | Raichelgauz et al. | |
| 8,316,005 B2 | 11/2012 | Moore | |
| 8,677,377 B2 | 3/2014 | Cheyer et al. | |
| 8,682,667 B2 | 3/2014 | Haughay | |
| 8,688,446 B2 | 4/2014 | Yanagihara | |
| 8,706,503 B2 | 4/2014 | Cheyer et al. | |
| 8,775,442 B2 | 7/2014 | Moore et al. | |
| 8,868,619 B2 * | 10/2014 | Raichelgauz | G06F 17/3002 707/803 |
| 8,880,539 B2 * | 11/2014 | Raichelgauz | G06F 17/3002 707/756 |
| 8,880,566 B2 * | 11/2014 | Raichelgauz | G06F 17/3002 707/803 |
| 8,898,568 B2 | 11/2014 | Bull et al. | |
| 8,922,414 B2 * | 12/2014 | Raichelgauz | H03M 7/30 341/159 |
| 8,959,037 B2 * | 2/2015 | Raichelgauz | H04H 20/103 706/10 |
| 8,990,125 B2 * | 3/2015 | Raichelgauz | G06F 17/30595 706/10 |
| 9,009,086 B2 * | 4/2015 | Raichelgauz | G06F 17/3028 706/12 |
| 9,031,999 B2 * | 5/2015 | Raichelgauz | G06F 17/30023 707/737 |
| 9,087,049 B2 * | 7/2015 | Raichelgauz | G06F 17/28 |
| 9,104,747 B2 * | 8/2015 | Raichelgauz | G06F 17/3028 |
| 9,191,626 B2 * | 11/2015 | Raichelgauz | H04H 20/103 |
| 9,197,244 B2 * | 11/2015 | Raichelgauz | H03M 7/30 |
| 9,218,606 B2 * | 12/2015 | Raichelgauz | G06Q 30/0201 |
| 9,235,557 B2 | 1/2016 | Raichelgauz et al. | |
| 9,256,668 B2 | 2/2016 | Raichelgauz et al. | |
| 2001/0019633 A1 | 9/2001 | Tenze et al. | |
| 2001/0056427 A1 | 12/2001 | Yoon et al. | |
| 2002/0087530 A1 | 7/2002 | Smith et al. | |
| 2002/0107827 A1 | 8/2002 | Benitez-Jimenez et al. | |
| 2002/0123928 A1 | 9/2002 | Eldering et al. | |
| 2002/0178410 A1 | 11/2002 | Haitsma et al. | |
| 2003/0028660 A1 | 2/2003 | Igawa et al. | |
| 2003/0041047 A1 | 2/2003 | Chang et al. | |
| 2003/0078766 A1 | 4/2003 | Appelt et al. | |
| 2003/0182567 A1 | 9/2003 | Barton et al. | |
| 2003/0191764 A1 | 10/2003 | Richards | |
| 2004/0068510 A1 | 4/2004 | Hayes et al. | |
| 2004/0107181 A1 | 6/2004 | Rodden | |
| 2004/0111465 A1 | 6/2004 | Chuang et al. | |
| 2004/0128142 A1 | 7/2004 | Whitham | |
| 2004/0128511 A1 | 7/2004 | Sun et al. | |
| 2004/0153426 A1 | 8/2004 | Nugent | |
| 2004/0249779 A1 | 12/2004 | Nauck et al. | |
| 2005/0177372 A1 | 8/2005 | Wang et al. | |
| 2006/0020860 A1 | 1/2006 | Tardif et al. | |
| 2006/0026203 A1 | 2/2006 | Tan et al. | |
| 2006/0031216 A1 | 2/2006 | Semple et al. | |
| 2006/0064037 A1 | 3/2006 | Shalon et al. | |
| 2006/0153296 A1 | 7/2006 | Deng | |
| 2006/0159442 A1 | 7/2006 | Kim et al. | |
| 2006/0173688 A1 | 8/2006 | Whitham | |
| 2006/0204035 A1 | 9/2006 | Guo et al. | |
| 2006/0236343 A1 | 10/2006 | Chang | |
| 2006/0242139 A1 | 10/2006 | Butterfield et al. | |
| 2006/0242554 A1 | 10/2006 | Gerace et al. | |

(56) References Cited

U.S. PATENT DOCUMENTS

| | | | |
|---|---|---|---|
| 2006/0248558 | A1 | 11/2006 | Barton et al. |
| 2006/0253423 | A1 | 11/2006 | McLane et al. |
| 2007/0074147 | A1 | 3/2007 | Wold |
| 2007/0130159 | A1 | 6/2007 | Gulli et al. |
| 2007/0195987 | A1 | 8/2007 | Rhoads |
| 2007/0220573 | A1 | 9/2007 | Chiussi et al. |
| 2007/0244902 | A1 | 10/2007 | Seide et al. |
| 2007/0253594 | A1 | 11/2007 | Lu et al. |
| 2007/0294295 | A1 | 12/2007 | Finkelstein et al. |
| 2008/0040277 | A1 | 2/2008 | Dewitt |
| 2008/0049629 | A1 | 2/2008 | Morrill |
| 2008/0072256 | A1 | 3/2008 | Boicey et al. |
| 2008/0091527 | A1 | 4/2008 | Silverbrook et al. |
| 2008/0163288 | A1 | 7/2008 | Ghosal et al. |
| 2008/0165861 | A1 | 7/2008 | Wen et al. |
| 2008/0201299 | A1 | 8/2008 | Lehikoinen et al. |
| 2008/0201314 | A1 | 8/2008 | Smith et al. |
| 2008/0204706 | A1 | 8/2008 | Magne et al. |
| 2008/0253737 | A1 | 10/2008 | Kimura et al. |
| 2008/0270373 | A1 | 10/2008 | Oostveen et al. |
| 2008/0313140 | A1 | 12/2008 | Pereira et al. |
| 2009/0013414 | A1 | 1/2009 | Washington et al. |
| 2009/0089587 | A1 | 4/2009 | Brunk et al. |
| 2009/0119157 | A1 | 5/2009 | Dulepet |
| 2009/0125529 | A1 | 5/2009 | Vydiswaran et al. |
| 2009/0148045 | A1 | 6/2009 | Lee et al. |
| 2009/0172030 | A1 | 7/2009 | Schiff et al. |
| 2009/0175538 | A1 | 7/2009 | Bronstein et al. |
| 2009/0204511 | A1 | 8/2009 | Tsang |
| 2009/0216639 | A1 | 8/2009 | Kapczynski et al. |
| 2009/0245603 | A1 | 10/2009 | Koruga et al. |
| 2009/0253583 | A1 | 10/2009 | Yoganathan |
| 2009/0277322 | A1 | 11/2009 | Cai et al. |
| 2010/0023400 | A1 | 1/2010 | Dewitt |
| 2010/0082684 | A1 | 4/2010 | Churchill et al. |
| 2010/0088321 | A1 | 4/2010 | Soloman et al. |
| 2010/0104184 | A1 | 4/2010 | Bronstein et al. |
| 2010/0106857 | A1 | 4/2010 | Wyler |
| 2010/0162405 | A1 | 6/2010 | Cook et al. |
| 2010/0191567 | A1 | 7/2010 | Lee et al. |
| 2010/0268524 | A1 | 10/2010 | Nath et al. |
| 2010/0318493 | A1 | 12/2010 | Wessling |
| 2010/0322522 | A1 | 12/2010 | Wang et al. |
| 2011/0035289 | A1 | 2/2011 | King et al. |
| 2011/0055585 | A1 | 3/2011 | Lee |
| 2011/0106782 | A1 | 5/2011 | Ke et al. |
| 2011/0145068 | A1 | 6/2011 | King et al. |
| 2011/0202848 | A1 | 8/2011 | Ismalon |
| 2011/0208822 | A1 | 8/2011 | Rathod |
| 2011/0251896 | A1 | 10/2011 | Impollonia et al. |
| 2011/0313856 | A1 | 12/2011 | Cohen et al. |
| 2012/0131454 | A1 | 5/2012 | Shah |
| 2012/0167133 | A1 | 6/2012 | Carroll et al. |
| 2012/0197857 | A1 | 8/2012 | Huang et al. |
| 2012/0330869 | A1 | 12/2012 | Durham |
| 2013/0067035 | A1 | 3/2013 | Amanat et al. |
| 2013/0086499 | A1 | 4/2013 | Dyor et al. |
| 2013/0325550 | A1 | 12/2013 | Varghese et al. |
| 2013/0332951 | A1 | 12/2013 | Gharaat et al. |
| 2014/0019264 | A1 | 1/2014 | Wachman et al. |
| 2015/0289022 | A1 | 10/2015 | Gross |

OTHER PUBLICATIONS

A New Multimedia Message Customizing Framework for mobile Devices Cunxun Zang; Qingshan Liu; Hanging Lu; Kongqiao Wang Multimedia and Expo, 2007 IEEE International Conference on Year: 2007 pp. 1043-1046, DOI: 10.1109/ICME.2007.4284832 IEEE Conference Publications.*
Electronic tour guide for Android mobile platform with multimedia travel book Mladenovic, V.; Lutovac, M.M.; Lutovac, M.D. Telecommunications Forum (TELFOR), 2012 20th Year: 2012 pp. 1460-1463, DOI: 10.1109/TELFOR.2012.6419494 IEEE Conference Publications.*
Compact video signatures for near-duplicate detection on mobile devices Kyung-Wook Park; Hyun-Ki Hong; Dong-Ho Lee Consumer Electronics (ISCE 2014), The 18th IEEE International Symposium on Year: 2014 pp. 1-2, DOI: 10.1109/ISCE.2014.6884293 IEEE Conference Publications.*
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cernansky et al., "Feed-forward Echo State Networks"; Proceedings of International Joint Conference on Neural Networks, Montreal, Canada, Jul. 31-Aug. 4, 2005.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Freisleben et al., "Recognition of Fractal Images Using a Neural Network", Lecture Notes in Computer Science, 1993, vol. 6861, 1993, pp. 631-637.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Fathy et al., "A Parallel Design and Implementation For Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
IPO Examination Report under Section 18(3) for corresponding UK application No. GB1001219.3, dated May 30, 2012.
IPO Examination Report under Section 18(3) for corresponding UK application No. GB1001219.3, dated Sep. 12, 2011.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Maass, W. et al.: "Computational Models for Generic Cortical Microcircuits", Institute for Theoretical Computer Science, Technische Universitaet Graz, Graz, Austria, published Jun. 10, 2003.
International Search Report for the corresponding International Patent Application PCT/IL2006/001235; Date of Mailing: Nov. 2, 2008.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251. German National Research Center for Information Technology.
Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

(56) References Cited

OTHER PUBLICATIONS

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

Foote, Jonathan, et al. "Content-Based Retrieval of Music and Audio", 1997 Institute of Systems Science, National University of Singapore, Singapore (Abstract).

Ribert et al. "An Incremental Hierarchical Clustering", Visicon Interface 1999, pp. 586-591.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Garcia, "Solving the Weighted Region Least Cost Path Problem Using Transputers", Naval Postgraduate School, Monterey, California, Dec. 1989.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop On Parallel and Distributed Processing, 1996. PDP '96.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Wang et al. "A Signature for Content-based Image Retrieval Using a Geometrical Transform", ACM 1998, pp. 229-234.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

* cited by examiner

SYSTEM AND METHOD FOR CAPTURING A MULTIMEDIA CONTENT ITEM BY A MOBILE DEVICE AND MATCHING SEQUENTIALLY RELEVANT CONTENT TO THE MULTIMEDIA CONTENT ITEM

CROSS-REFERENCE TO RELATED APPLICATIONS

This application claims the benefit of U.S. Provisional Application No. 61/766,703 filed on Feb. 20, 2013. This application is also a continuation-in-part (CIP) application of U.S. patent application Ser. No. 13/685,182 filed on Nov. 26, 2012, now pending, which is a CIP of:

(a) U.S. patent application Ser. No. 13/624,397 filed on Sep. 21, 2012, now pending;

(b) U.S. patent application Ser. No. 13/344,400 filed on Jan. 5, 2012, now pending, which is a continuation (CON) of U.S. patent application Ser. No. 12/434,221, filed May 1, 2009, now U.S. Pat. No. 8,112,376;

(c) U.S. patent application Ser. No. 12/084,150 having a filing date of Apr. 7, 2009, now allowed, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006; and, (d) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part (CIP) of the above-referenced U.S. patent application Ser. No. 12/084,150.

All of the applications referenced above are herein incorporated by reference for all that they contain.

TECHNICAL FIELD

The invention generally relates to systems and methods for capturing information viewed on a mobile device, and more specifically to systems and methods for enabling display of matching relevant content to multimedia content captured by a mobile device.

BACKGROUND

As the world wide web (WWW) continues to exponentially grow in size and content, the task of finding relevant multimedia content becomes increasingly complex. Upon finding such content, many users wish to have the ability to view the content at a later time, from a different device or source. Current communication tools such as web browsers or search engines do not provide an easy and convenient way for a person to view, locate, or otherwise access information at a later time and/or from a different device. One solution that caters to this need involves use of bookmarks (URLs) to a web page that contains the specific content. However, URLs, and by extension bookmarks pointing to web pages, are dynamically changed. Thus, visiting a URL, e.g., a week later, may lead users to content other than the particular content that the users' wish to view.

Other solutions allow viewing the same web page across different devices. For example, a web page CNN.COM opened on a smartphone device can be opened on the PC when a user launches the browser thereon. However, only a recent session on one device can be displayed (or opened) on another device. For example, the last viewed web page or video. In addition, such a solution requires that the devices be registered with a particular user. Thus, content viewed on a device that does not belong to the user can be later viewed on the user's device without having the user search, locate and access the content.

It would be therefore advantageous to provide a solution for providing an efficient way for a user to mark a multimedia content such that the user is capable of accessing the multimedia content item or a successive related content item at a later time and/or from a different device.

SUMMARY

Certain embodiments disclosed herein include a method for matching sequentially relevant content to at least one multimedia content item (MMCI) captured by a mobile device. The method comprises receiving from a mobile device the MMCI captured by at least one sensor of the mobile device; generating a signature for the captured MMCI; and matching at least one sequentially relevant content items respective of the signature of the captured MMCI.

Certain embodiments disclosed herein also include a system for matching sequentially relevant content to at least one MMCI captured by a mobile device. The system comprises an interface to a network for receiving one or more MMCIs from a mobile device; a processor; and a memory coupled to the processor, the memory contains instructions that when executed by the processor cause the system to: receive from a mobile device MMCI captured by one or more sensors integrated in the mobile device; cause generation of at least one signature for the captured MMCI; and match one or more sequentially relevant content items respective of the signature of the captured MMCI.

Certain embodiments disclosed herein also include an apparatus for matching sequentially relevant content to at least one MMCI captured by a mobile device. The apparatus comprises at least one sensor for receiving at least one MMCI from a mobile device; a processor; a signature generator system coupled to the processor; and a memory coupled to the processor, the memory contains instructions that when executed by the processor cause the apparatus to: capture an MMCI; generate a signature for the captured MMCI; and match one or more sequentially relevant content items respective of the signature of the captured MMCI.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
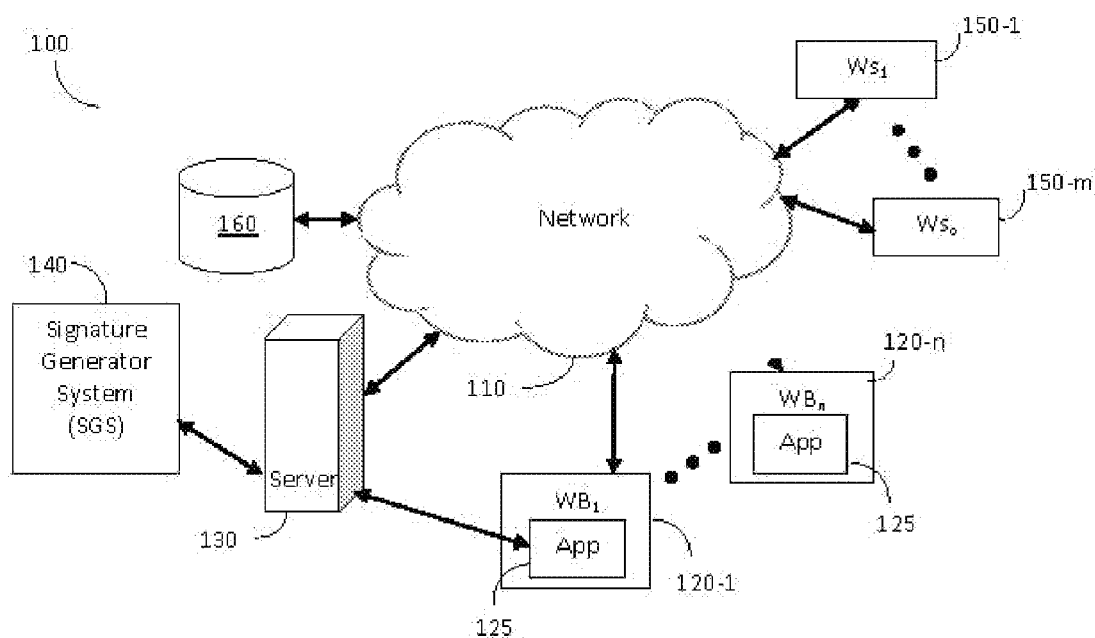
FIG. 1 is a schematic block diagram of a system utilized to describe the various disclosed embodiments.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a system 100 for providing content items for matching multimedia content displayed in a web-page in accordance with one embodiment. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more computing devices, 120-1 through 120-n (collectively referred to hereinafter as computing devices 120 or individually as a computing device 120, merely for simplicity purposes). Each computing device 120 may be, for example, a personal computer (PC), a personal digital assistant (PDA), a mobile phone, a smart phone, a tablet computer, a wearable computing device, and other kinds of wired and mobile appliances, equipped with browsing, capturing, viewing, listening, filtering, and managing content capabilities, etc., that are enabled as further discussed herein below.

Each computing device 120 executes at least one application 125 that can render multimedia content captured by the device (e.g., from a video camera) over the device's display. An application 125 also communicates with the server 130, enabling performance of the embodiments disclosed in detail above. As a non-limiting example, an application 125 is a web browser, independent application, or plug-in application.

The server 130 is further connected to the network 110. The server 130 communicates with the devices 120 to receive captured multimedia content or links to such content. The content provided by the devices 120 may be associated with a request to view the content on a different device 120 or the same device at a different time. Such a request is sent by the application 125. The multimedia content may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The server 130 is also communicatively connected to a signature generator system (SGS) 140, either directly or through the network 110. In one embodiment, the SGS 140 may be embedded in the server 130. The server 130 is enabled to receive and serve multimedia content and causes the SGS 140 to generate a signature respective of the multimedia content. The generated signature(s) may be robust to noise and distortion. The process for generating the signatures for multimedia content is explained in more detail herein below with respect to FIGS. 3 and 4.

It should be noted that the server 130 typically comprises a processing unit and a memory (not shown). The processor is coupled to the memory, which is configured to contain instructions that can be executed by the processing unit. The server 130 also includes a network interface (not shown) to the network 110. In one embodiment, the server 130 is communicatively connected or includes an array of Computational Cores configured as discussed in more detail below.

A plurality of web servers 150-1 through 150-m are also connected to the network 110, each of which is configured to generate and send content to the server 130. In an embodiment, the web servers 150-1 through 150-m typically, but not necessarily exclusively, are resources for information that be utilized to provide multimedia content relevant to a multimedia content items captured by the devices 120. In one embodiment, the content and the respective generated signatures may be stored in a data warehouse 160 which is connected to the server 130 (either directly or through the network 110) for further use.

The system 100 may be configured to generate customized channels of multimedia content. Accordingly, a web browser 125 or a client channel manager application (not shown) available either on the server 130, on the web browser 120, or as an independent or plug-in application, may enable a user to create customized channels of multimedia content by receiving selections made by a user as inputs. Such customized channels of multimedia content are personalized content channels that are generated in response to selections made by a user of the application 125 or the client channel manager application. The system 100, and in particular the server 130 in conjunction with the SGS 140, determines which multimedia content is more suitable to be viewed, played or otherwise utilized by the user with respect to a given channel, based on the signatures of selected multimedia content. These channels may optionally be shared with other users, used and/or further developed cooperatively, and/or sold to other users or providers, and so on. The process for defining, generating, and customizing the channels of multimedia content are described in greater detail in the co-pending Ser. No. 13/344, 400 application referenced above.

To demonstrate the disclosed embodiments, it is assumed, merely for the sake of simplicity and without limitation on the generality of the disclosed embodiments, that computing device 120-1 is a mobile or handheld device belonging to a certain user.

According to the disclosed embodiments, a multimedia content item is captured by the device 120-1. The capturing of the multimedia content item may be performed by, e.g., one or more sensors integrated within the device 120-1. In an embodiment, the capturing also includes selection of a multimedia content item stored locally in the device 120-1. A sensor may be, for example, but not limited to, a camera, a microphone, a temperature sensor, a global positioning system (GPS), a light intensity sensor, an image analyzer, a sound sensor, an ultrasound sensor, a speech recognizer, and so on.

The server 130 is configured to receive and analyze the captured multimedia content item. This includes querying or requesting the SGS 140 to generate for the multimedia content item, provided by the server 130, at least one signature. Then, using the generated signature(s) the server 130 is configured to search web servers 150-1 through 150-m for sequentially relevant multimedia content items.

Sequentially relevant content items are content items related to a particular multimedia content item (MMCI) through a predetermined sequence or series such as, but not limited to, episodes of a television show; pages or chapters of a book; books in a series (e.g., the Harry Potter series of books); pages or issues of a comic strip or magazine; groups of similar items arranged in chronological order; etc. Such sequentially relevant items may be the content item that the MMCI was captured from (e.g., a video containing a captured MMCI in the form of an image), a successively related content item, etc. Successively related content items are content items that occur later in a sequence or series than a given content item.

For example, if the MMCI being analyzed is an image from the first episode of the television show "Breaking Bad," a successively related content item to the first episode of the show may be the second episode of "Breaking Bad." Note that any given sequence or series may have a length of 1 (e.g., only 1 content item in the sequence or series). As a non-limiting example, if the signature of an image indicates that the image belongs to a particular episode of the television (TV) series "Lost" (e.g., episode 1) then the sequentially relevant episode of "Lost" (episode 1) or a link thereto, is sent to the user device 120-1.

In an embodiment, a relevant video content item may feature associations of particular times within the video to given MMCIs. For example, if the signature of an image indicates that the image represents a frame related to a particular time of an episode of the television show American Idol® (e.g., season 1, episode 5, 20 minutes and 31 seconds from the beginning of the episode), then a sequentially relevant video of season 1 episode 5 would begin playing at 20 minutes and 31 seconds from the beginning of the episode after the episode is returned to the user device.

In an embodiment, MMCIs may belong to more than one sequence and/or series. For example, if a user captures a video clip from the movie Rocky, a sequence of related content items may consist solely of movies in the Rocky series. Another sequence of related items to the image of the Rocky movie may be a list of all movies in which actor Sylvester Stallone appears ordered chronologically. In a further embodiment, a user may be prompted to select which sequence or series he or she would like to receive sequentially related content from.

In another embodiment, the server 130 may return a successive issue of the magazine (e.g., issue 5 from 2013). As a non-limiting example, a user may capture an image of a page from an issue of Time® magazine (e.g., issue 4 from 2013, page 30). Based on this image, the server 130 may determine which page and/or issue the image is from, and return that page and/or issue to the user. In yet another embodiment, the options for sequences or series presented to a user are pre-populated based on inputs from other users.

According to another embodiment, the SGS 140 is integrated in the computing device 120-1, thereby allowing the computing device 120-1 to capture and analyze one or more MMCIs while operating without a network connection. As an example, an image of a TV screen presenting an advertisement of a Dodge® automobile is captured by the camera of the device 120-1 while operating off-line. According to another embodiment, the request for relevant content is sent to the server 130, which searches the network 110 for relevant content. As an example, such content may be pictures of similar vehicles ordered by the year each car was released in that are stored in the pictures storage folder of the mobile device 610. If the device 120-1 can access the server 130, then the server 130 will initiate the search for matching content relevant to the captured multimedia element item.

The SGS 140 is configured to analyze the captured image and to generate one or more signatures respective thereto. Upon receiving a request for sequentially relevant content to the captured image, the mobile device 120-1 searches for relevant content locally stored therein. According to one embodiment, the determination of which content is relevant may be performed by, for example, a signature matching process based on signatures generated as discussed hereinabove. In an exemplary embodiment, two signatures are determined to be matching if their respective signatures at least partially match (e.g., in comparison to a predefined threshold).

It should be appreciated that the signature generated for a captured multimedia content element would enable accurate recognition of sequentially relevant content, because the signatures generated, according to the disclosed embodiments, allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

Figure 2:
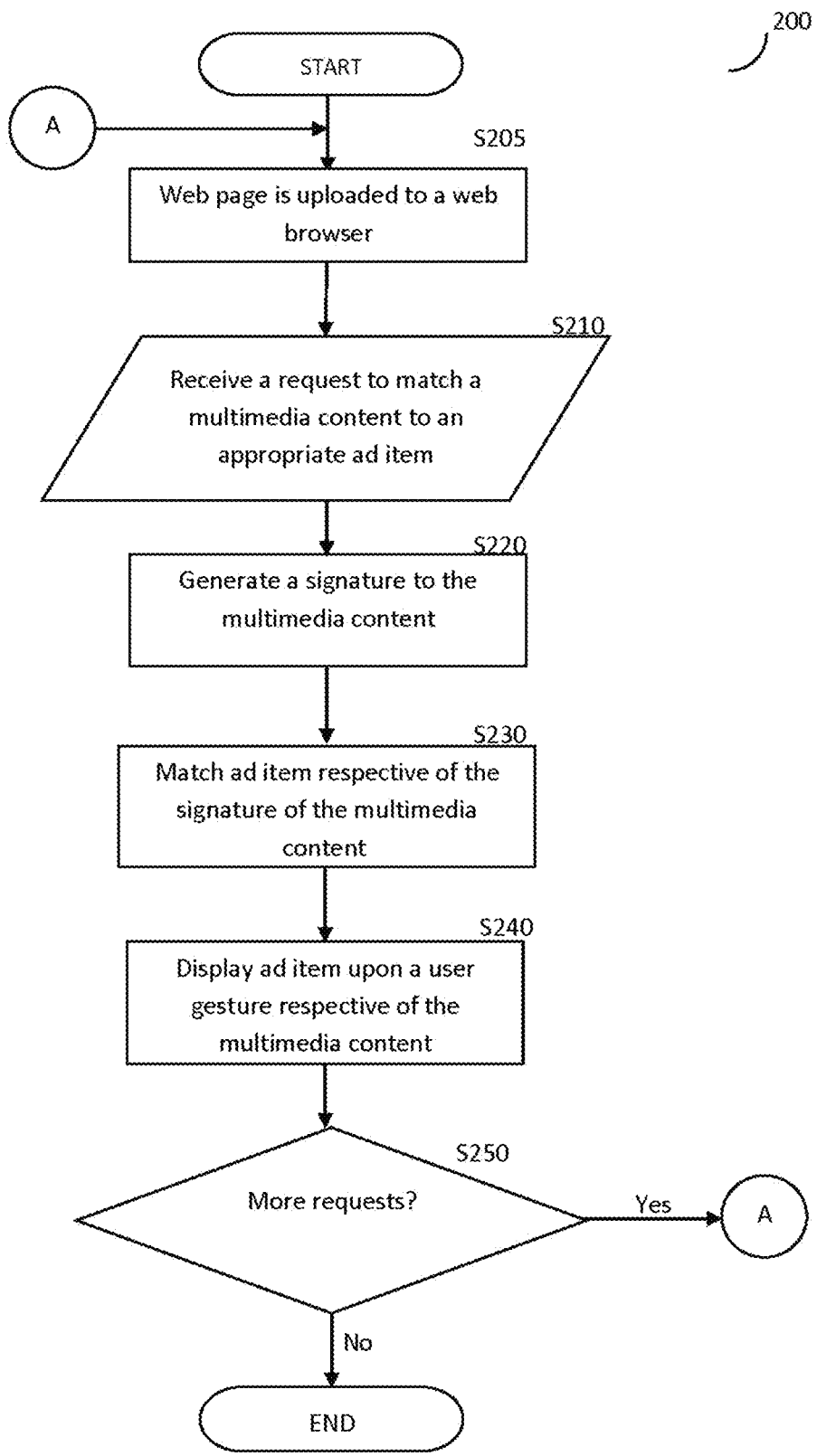
FIG. 2 is a flowchart describing the process of matching a content item to multimedia content displayed on a web-page according to an embodiment.

FIG. 2 depicts an exemplary and non-limiting flowchart 200 describing the process of matching an advertisement to multimedia content displayed on a web-page. In S205, the method starts when a web-page is uploaded to an application 125 (e.g., a web-browser). In S210, a request to match at least one MMCI (or a multimedia content element) contained in the uploaded web-page to an appropriate advertisement item is received. The request can be received from a web server (e.g., a server 150-1), a script running on the uploaded web-page, or an agent (e.g., an add-on) installed in the web-browser. S210 can also include extracting the at least one MMCI and requesting that signatures be generated.

In S220, a signature to the multimedia content element is generated. The generation of the signature for the multimedia content element by a signature generator is described below. In S230, an advertisement item matched to the multimedia content element respective of its generated signature. In one embodiment, the matching process includes searching for at least one advertisement item respective of the signature of the multimedia content and a display of the at least one advertisement item within the display area of the web-page. In one embodiment, the matching of an advertisement to a multimedia content element can be performed by the computational cores that are part of a large scale matching discussed in detail below.

In S240, upon a user's gesture the advertisement item is uploaded to the web-page and displayed therein. The user's gesture may be: a scroll on the multimedia content element, a press on the multimedia content element, and/or a response to the multimedia content. This ensures that the user attention is given to the advertised content. In S250 it is checked whether there are additional requests to analyze multimedia content elements, and if so, execution continues with S210; otherwise, execution terminates.

As a non-limiting example of a matching process, a user uploads a web-page that contains an image of a sea shore. The image is then analyzed and a signature is generated respective thereto. Respective of the image signature, an advertisement item (e.g., a banner) is matched to the image, for example, a swimsuit advertisement. Upon detection of a user's gesture, for example, a mouse scrolling over the sea shore image, the swimsuit ad is displayed.

The web-page may contain a number of multimedia content elements; however, in some instances only a few content items may be displayed in the web-page. Accordingly, in one embodiment, the signatures generated for the multimedia content elements are clustered and the cluster of signatures is matched to one or more advertisement items.

Figure 3:
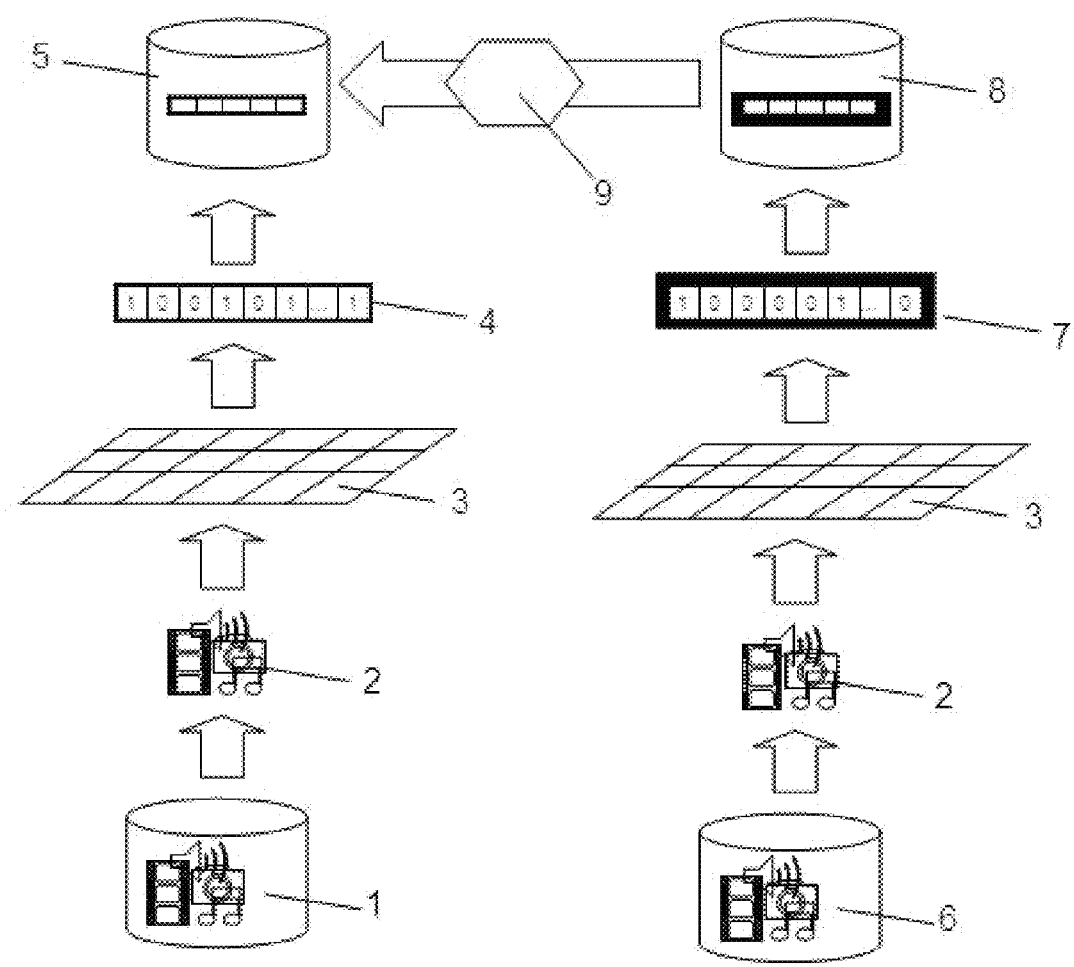
FIG. 3 is a block diagram depicting the basic flow of information in the signature generator system.
Figure 4:
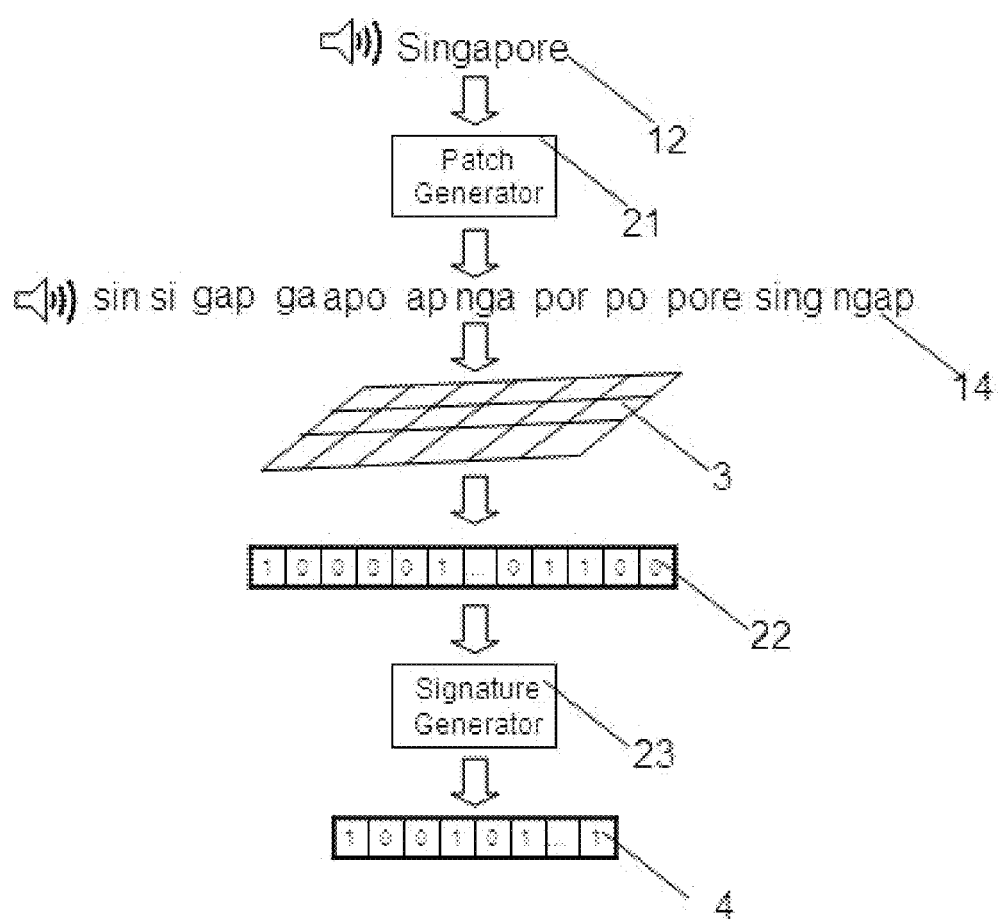
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel to all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \Box(V_i - Th_x)$$

where, $\Box$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$ $$1-p(V>Th_S)-1-(1-\epsilon)^l \ll 1$$

i.e., given that l nodes (cores) constitute a Robust Signature of a certain image I, the probability that not all of these l nodes will belong to the Signature of same, but noisy image, $\tilde{-}$ is sufficiently low (according to a system's specified accuracy).

2: $p(V_i > Th_{RS}) \approx l/L$ i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for realizing certain goals in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals being used, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation, the computational architecture, and the process for configuring such cores is discussed in more detail in the co-pending U.S. patent application Ser. No. 12/084,150 referenced above.

Figure 5:
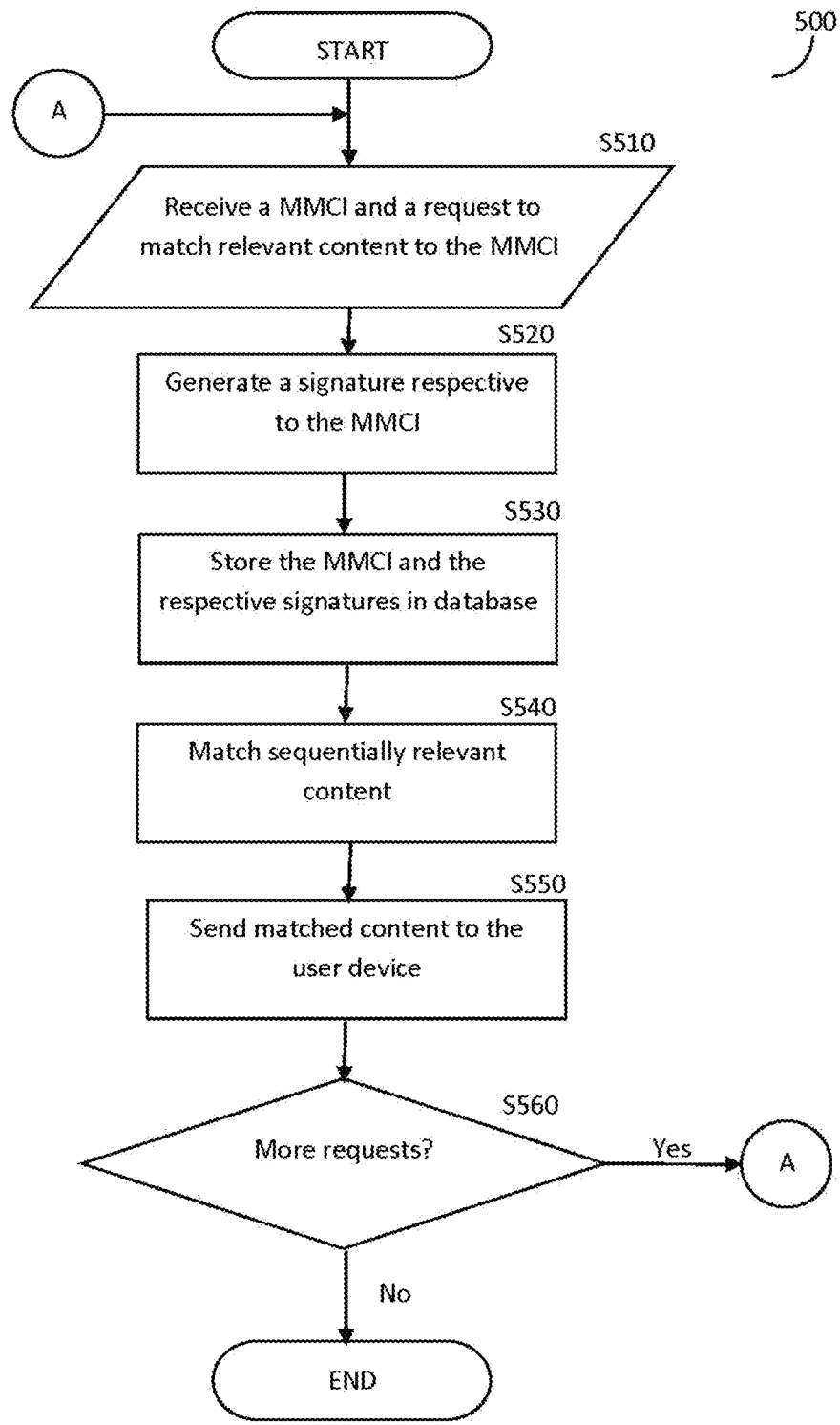
FIG. 5 is a flowchart describing a process of matching sequentially relevant content items to a multimedia content item according to an embodiment.

FIG. 5 depicts an exemplary and non-limiting flowchart 500 of a method for analyzing multimedia content items captured by a mobile device and returning sequentially relevant content items to a user according to an embodiment. In an embodiment, the method is performed by the server 130 using the SGS 140.

In S510, the method starts when a multimedia content item (MMCI) captured by the mobile device and a request to match relevant content to the MMCI are received. In S520, a signature to the MMCI is generated as discussed above. The signature for the MMCI is generated by the SGS 140 as described hereinabove. In S530, the MMCI together with the respective signature is stored in a data warehouse such as, for example, the database 160, for further use. The data warehouse may be native or cloud-based over the web.

In S540, sequentially relevant multimedia content is matched to the retrieved multimedia content item. It should be understood that one or more content items may be provided to the user respective to the request. The relevant content may be identified locally, on the mobile device, or over the network 110 through one or more of the web sources 150. Content may be determined to be relevant based on one or more parameters related to the user. Such parameters may relate to, e.g., the time of the day during which the request was received, the location of the mobile device, the weather in the location of the mobile device, etc. The user's parameters may be collected by one or more of the sensors integrated in the mobile device 610.

In S550, the one or more relevant content items are sent to the user device. According to one embodiment (not shown), the relevant content is then displayed on the mobile device.

In S560, it is checked whether there are additional requests, and if so, execution continues with S510; otherwise, execution terminates. It should be understood to one of ordinary skill in the art that the operation of capturing and analyzing the multimedia content item may be performed off-line without communicating with the server 130 through the network 110 in such cases where the SGS 140 is integrated within the mobile device 610.

As a non-limiting example, a user captures an image of a video clip displaying over the screen of the mobile device. The image is then analyzed and a signature is generated respective thereto. The image together with the respective signature is stored in a data warehouse. Upon receiving a request to match relevant content to the captured image, the captured image and the respective signature are retrieved from the data warehouse. The server 130 then generates the subsequent stream of the video clip and displays the full video clip over the mobile device.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for matching sequentially relevant content to at least one multimedia content item (MMCI) captured by a mobile device, comprising:
   receiving from a mobile device the MMCI captured by at least one sensor of the mobile device;
   generating a signature for the captured MMCI; and
   matching at least one sequentially relevant content item respective of the signature of the captured MMCI.

2. The method of claim 1, wherein the at least one sensor is any one of: a camera, a microphone, a temperature sensor, a global positioning system (GPS), a pressure sensor, a light intensity sensor, an image analyzer, a sound sensor, an ultrasound sensor, and a speech recognizer.

3. The method of claim 1, further comprising:
   storing the captured MMCI in a database; and
   retrieving the captured MMCI from the database upon receiving a request to match sequentially relevant content items to the captured MMCI.

4. The method of claim 1, further comprising:
   providing the at least one matched sequentially relevant content items to the mobile device.

5. The method of claim 1, wherein the matched content is determined based on at least one parameter related to the user.

6. The method of claim 5, wherein the at least one parameter is at least one of: a time of a day at which the request is received, a location of the user, and weather within the location of the user.

7. The method of claim 5, wherein the at least one parameter related to the user is collected by the at least one sensor of the mobile device.

8. The method of claim 1, wherein the multimedia content item is at least one of: an image, graphics, a video stream, a video clip, an audio stream, an audio clip, a video frame, a photograph, images of signals, combinations thereof, and portions thereof.

9. The method of claim 1, wherein the sequentially relevant content item is successive to the MMCI.

10. A non-transitory computer readable medium having stored thereon instructions for causing one or more processing units to execute the method according to claim 1.

11. A system for matching sequentially relevant content to at least one multimedia content item (MMCI) captured by a mobile device, comprising:
   an interface to a network for receiving one or more multimedia content items (MMCIs) from a mobile device;
   a processor; and
   a memory coupled to the processor, the memory contains instructions that when executed by the processor cause the system to:
   receive from a mobile device MMCI captured by one or more sensors integrated in the mobile device;
   cause generation of at least one signature for the captured MMCI; and
   match one or more sequentially relevant content items respective of the signature of the captured MMCI.

12. The system of claim 11, wherein the sensor is any one of: a camera, a microphone, a temperature sensor, a global positioning system (GPS), a pressure sensor, a light intensity sensor, an image analyzer, a sound sensor, an ultrasound sensor, and a speech recognizer.

13. The system of claim 11, wherein the system further comprises:
   a signature generator for generating the at least one signature for the captured MMCI.

14. The system of claim 11, wherein the system is connected to a database, wherein the system is further configured to:
    store the captured MMCI in the database; and
    retrieve the captured MMCI from the database upon receiving a request to match sequentially relevant content items to the captured MMCI.

15. The system of claim 11, wherein the matched content is determined based on at least one parameter related to the user.

16. The system of claim 15, wherein the at least one parameter is least one of: a time of the day at which the request is received, a location of the user, and weather within the location of the mobile device.

17. The system of claim 15, wherein the at least one parameter related to the user are collected by the one or more sensors of the mobile device.

18. The system of claim 11, wherein the system is further configured to match the at least one sequentially relevant content items to the mobile device.

19. The system of claim 11, wherein the multimedia content is at least one of: an image, graphics, a video stream, a video clip, an audio stream, an audio clip, a video frame, a photograph, images of signals, combinations thereof, and portions thereof.

20. The system of claim 11, wherein the sequentially related content item is successive to the MMCI.

21. An apparatus for matching sequentially relevant content to at least one captured multimedia content item (MMCI), comprising:
    at least one sensor for receiving at least one multimedia content item (MMCI) from a mobile device;
    a processor;
    a signature generator system coupled to the processor; and
    a memory coupled to the processor, the memory contains instructions that when executed by the processor cause the apparatus to:
        capture an MMCI;
        generate a signature for the captured MMCI; and
        match sequentially relevant content items respective of the signature of the captured MMCI.

22. The apparatus of claim 21, wherein the at least one sensor is at least one of: a camera, a microphone, a temperature sensor, global positioning system (GPS), a pressure sensor, a light intensity sensor, an image analyzer, a sound sensor, an ultrasound sensor, and a speech recognizer.

23. The apparatus of claim 21, wherein the apparatus further comprises a storage device.

24. The apparatus of claim 21, wherein the apparatus is further configured to:
    store the captured MMCI in a database; and
    retrieve the captured MMCI from the database upon receiving a request to match sequentially relevant content items to the captured MMCI.

25. The apparatus of claim 21, wherein the matched content is determined based on at least one parameter related to the user.

26. The apparatus of claim 25, wherein the at least one parameter are at least one of: a time of a day at which the request is received, a location of the user, and weather within the location of the user.

27. The apparatus of claim 25, wherein the at least one parameter relates to the user are collected by the one or more sensors.

28. The apparatus of claim 21, wherein the apparatus is further configured to display the matched one or more sequentially relevant content items.

29. The apparatus of claim 21, wherein the multimedia content is at least one of: an image, graphics, a video stream, a video clip, an audio stream, an audio clip, a video frame, a photograph, images of signals, combinations thereof, and portions thereof.

30. The apparatus of claim 20, wherein the sequentially related content item is successive to the MMCI.

* * * * *